United States Patent [19]

Eichenauer

[11] 4,276,761
[45] Jul. 7, 1981

[54] STEERING COLUMN AND IGNITION LOCK FOR MOTOR VEHICLE

[76] Inventor: Rudolf Eichenauer, Hollbergstrasse 1, D-6000 Frankfurt am Main, Fed. Rep. of Germany

[21] Appl. No.: 931,397

[22] Filed: Aug. 4, 1978

[30] Foreign Application Priority Data

Jan. 14, 1978 [DE] Fed. Rep. of Germany ....... 2801531

[51] Int. Cl.³ ...................... B60R 25/02; E05B 65/12
[52] U.S. Cl. ...................................... 70/252; 70/186; 70/360
[58] Field of Search ................. 70/186, 185, 252, 360, 70/455

[56] References Cited

U.S. PATENT DOCUMENTS

| | | | |
|---|---|---|---|
| 2,868,007 | 1/1959 | Neiman et al. | 70/252 |
| 3,590,611 | 7/1971 | Kakashima | 70/186 |
| 3,877,265 | 4/1975 | Schaumberg | 70/252 |
| 3,902,341 | 9/1975 | Peitsmeier | 70/252 |
| 4,031,728 | 6/1977 | Eichenauer | 70/252 |
| 4,052,869 | 10/1977 | Weber | 70/252 |

FOREIGN PATENT DOCUMENTS

| | | | |
|---|---|---|---|
| 2354135 | 5/1974 | Fed. Rep. of Germany | 70/252 |
| 2501479 | 7/1976 | Fed. Rep. of Germany | 70/455 |
| 1381866 | 1/1975 | United Kingdom | 70/252 |

*Primary Examiner*—Roy D. Frazier
*Assistant Examiner*—Carl F. Pietruszka
*Attorney, Agent, or Firm*—Kurt Kelman

[57] ABSTRACT

A coincidental lock for a motor vehicle comprises a key controlled lock cylinder mounted in the axial bore of a housing for axial displacement and for rotation in its inward position into selected operating positions. A lock bolt is mounted in a cross bore of the housing for displacement between a retracted and a locking position for the steering column of the vehicle. A spring biases the lock bolt into the locking position and displaces the lock cylinder outwardly, and a latch member on the lock bolt maintains the lock bolt in the retracted position when the lock cylinder is in the inward position. A driving member operated by the rotation of the lock displaces the bolt against the spring bias into the retracted position and includes a control ring and, eccentrically arranged thereon, a first cam, a second arcuate cam having an oblique camming face for engagement with the latch member in the retracted position and a third cam projecting from the control ring towards the lock bolt and having an oblique camming face. A fourth cam on the lock bolt cooperates with the third cam to position its camming face in subtending engagement with the fourth cam in a ready-to-lock position.

3 Claims, 8 Drawing Figures

STEERING COLUMN AND IGNITION LOCK FOR MOTOR VEHICLE

The present invention relates to improvements in a lock arrangement for a motor vehicle having a steering column. As is well known, combined steering column and ignition locks, also called coincidential locks, enable the steering column of a motor vehicle to be locked and unlocked simultaneously with the opening and closing of the ignition switch through actuation of a key controlled lock.

In my U.S. Pat. No. 4,031,728, dated June 28, 1977, I have disclosed a lock arrangement of this general type comprising a housing defining an axial bore and a cross bore intersecting therewith, a key controlled lock cylinder mounted in the axial bore of the housing for axial displacement from an outwardly displaced position into an inwardly displaced position, and for rotation by the key about the axis of the bore in the inwardly displaced position into selected operating position, and a lock bolt mounted in the cross bore for displacement from a retracted position into a locking position upon removal of the key from the lock cylinder, causing the cylinder to assume the outwardly displaced position. Actuating means is arranged to displace the lock bolt between the retracted and locking positions, the bolt actuating means including an operating spring biased to displace the lock bolt into the locking position and a driving member operated by the rotation of the lock cylinder to displace the bolt against the bias of the operating spring into the retracted position. The bolt has a keeper engaging the steering column in the locking position and which is disengaged from the steering column in the retracted position. Latch means mounted on the lock bolt cooperates with the lock cylinder for maintaining the lock bolt in the retracted position when the lock cylinder is in the inwardly displaced position. When the ignition key is inserted in the keyhole of the lock cylinder and the cylinder is rotated to retract the bolt, the inwardly displaced cylinder holds the bolt in the retracted position by means of the latch means and the bolt is permitted to return to its locking position under the bias of the operating spring only when the key is withdrawn and the cylinder is in the outwardly displaced position.

It is the primary object of this invention to improve this lock arrangement by providing cam means on the lock bolt permitting an outward bias to be exerted upon the lock cylinder temporarily in the retracted position of the lock bolt.

The above and other objects are accomplished according to the invention with a driving member including a control ring rotating and axially displaced with the lock cylinder, cam means arranged eccentrically on the control ring, the cam means comprising a first cam, a second arcuate cam having an oblique camming face for engagement with the latch means in the retracted position of the lock bolt, and a third cam projecting from the control ring towards the lock bolt and having an oblique camming face, and a fourth cam on the lock bolt, the fourth cam and the third cam being arranged to position the oblique camming face of the third cam in subtending engagement with the fourth cam in a ready-to-lock position of the lock bolt whereby the lock bolt is temporarily prevented from moving from the retracted into the locking position. The cams are dimensioned and shaped to enable the lock cylinder to be rotated into the selected operating positions.

In this arrangement, the spring-biased pivotal latch maintaining the lock bolt in the retracted position in the lock arrangement of my prior patent can be replaced by a simple sliding element mounted in a recess in the lock bolt, thus simplifying the structure. The improved lock arrangement also saves control elements, such as pins and cooperating grooves, for controlling the rotation and displacement of the lock cylinder.

The above and other objects, advantages and features of the present invention will become more apparent from the following description of a now preferred embodiment, taken in conjunction with the accompanying drawing wherein FIG. 1 is an axial section of a steering lock according to this invention, with the lock cylinder and driver element in partial side elevational view, the key being inserted and the steering column lock bolt in a ready-to-lock, retracted position;

Figure 1:
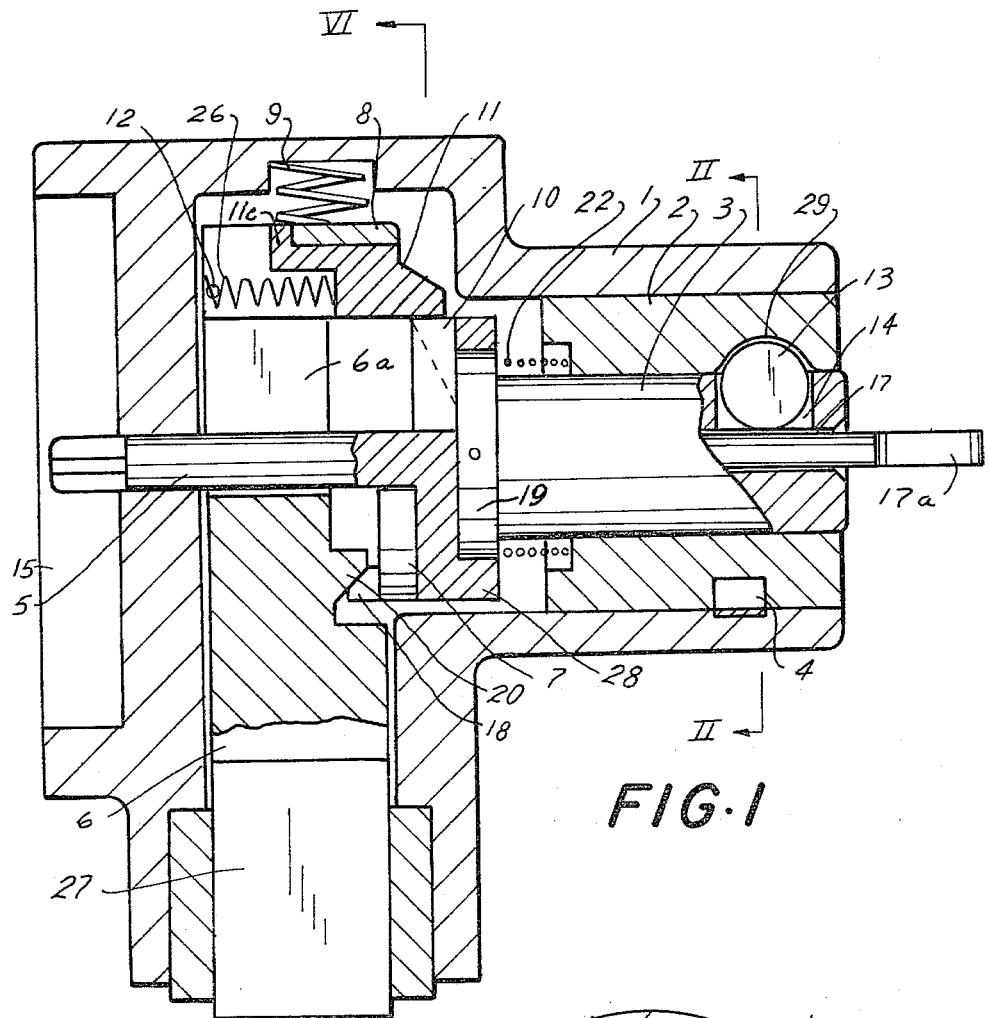

Referring now to the drawing, there is shown steering lock housing 1 defining an axial bore holding lock barrel 2 which, in turn, has an axial bore receiving lock cylinder 3 for axial displacement or withdrawal of key 17a from an outwardly displaced position into an inwardly displaced position, and for rotation by the key 17a about the axis of the bore in the inwardly displaced position into selected operating positions. Driver element 5 extends axially from the inner end of lock cylinder 3 and carries an end portion for operating respective switches of an electrical operating circuit in switch box 15 of any conventional design for actuating the ignition and, if desired, other operations of the car.

Housing 1 also has a cross bore intersecting with the axial bore of the housing and retractible lock bolt 6 is slidably mounted in the cross bore for displacement from a retracted position (shown in FIGS. 1, 5, 6 and 8), wherein steel tip or keeper 27 of the bolt is withdrawn from a matching recess in the steering column (not shown), and a locking position (shown in FIG. 7), wherein the keeper of bolt 6 engages the steering column recess and thus locks the steering column against movement. Since coincidential locks combining control of the steering column and ignition are well known, ignition circuitry 15 has not been further illustrated and described, nor has the steering column been shown in cooperation with its locking bolt. As illustrated, driver element 5 passes through elongated slot 6a in bolt 6 and through a bore in housing 1 to enable its end portion to operate circuitry 15.

The lock barrel and cylinder are held against unauthorized removal from housing 1 by leaf spring 4 in a generally known manner, all of the above structure and operation being substantially the same as, or equivalent to, those fully described and illustrated in my U.S. Pat. No. 4,031,728.

The inner end of lock cylinder 3 carries collar 19 and compression spring 22 is mounted between the collar and a recessed seat in lock barrel 2, spring means 22 being biased to displace the lock cylinder into the inwardly displaced position towards lock bolt 6 in the retracted position of the lock bolt (see FIG. 1). The bias of spring 9 exceeds that of spring 22.

With flat ignition key 17a removed and lock cylinder 3 in the OFF-position, coil spring 9, whose one end rests in a recessed seat in housing 1 while its other end presses against lock bolt 6, slides the lock bolt forwardly in the cross bore into a position wherein keeper 27 engages the keeper-receiving recess in the steering column and locks the same. When it is desired to operate the motor vehicle, the ignition key is inserted into the keyhole of lock cylinder 3 and the cylinder is turned by the key from the OFF-position into a ready-for-driving position (see FIG. 8).

Figure 3:
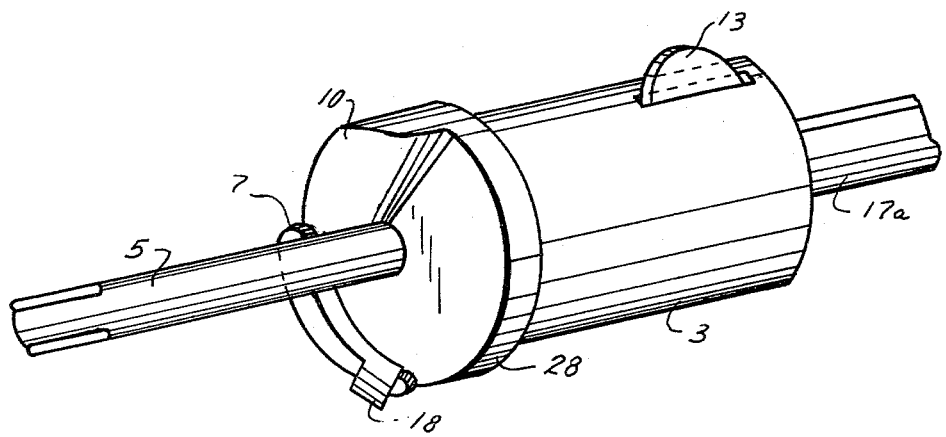
FIG. 3 shows a perspective view of the lock cylinder and driver element, including the driver member of the invention, this figure being mirror-backwards in relation to FIGS. 5–8 to provide a clearer showing of the cams on the control ring.

The lock arrangement comprises a driving member operated by the rotation of lock cylinder 3 to displace lock bolt 6 against the bias of operating spring 9 into the retracted position to disengage the keeper from the steering column. This driving member includes according to the present invention control ring 28 rotating and axially displaced with lock cylinder 3. As best shown in FIG. 3, cam means is arranged eccentrically on control ring 28 and this cam means comprises first cam 7, second arcuate cam 10 having a periphery and an oblique camming face, and third cam 18 projecting from control ring 28 towards the lock bolt and having an oblique camming face.

Figure 4:
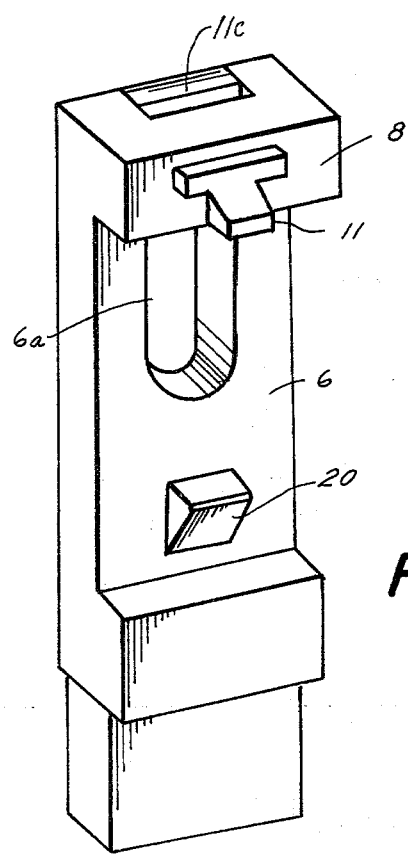
FIG. 4 shows a perspective view of the lock bolt.
Figure 5:
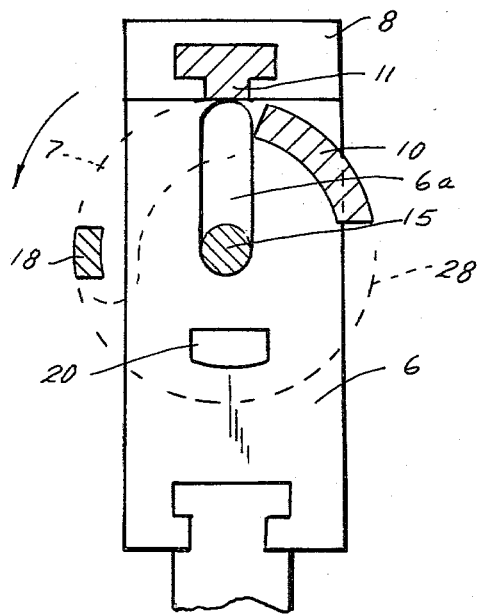
FIGS. 5 to 8 are sectional views along line VI—VI of FIG. 1, FIG. 5 showing the lock bolt in the driving position, FIG. 6 showing the lock bolt in the ready-to-lock position of FIG. 1, FIG. 7 showing the lock bolt in the locking position and FIG. 8 showing the lock bolt during rotation of the lock cylinder into the ignition or driving position.

As best illustrated in FIGS. 1 and 4, lock bolt 6 carries latch member 11 which constitutes a latch means cooperating with lock cylinder 3 for maintaining the lock bolt in the retracted position when the lock cylinder is in the inwardly displaced position and the lock cylinder is turned into the driving position shown in FIG. 5 wherein cam 7 subtends latch member 11, this cam extending over about a quarter of the periphery of control ring 28. The preferred and illustrated latch means is member 11 of T-shaped cross section (see FIGS. 5 to 8) and slidably mounted in a recess of like cross section defined in lock bolt 6. Latch member 11 may be a metallic casting or a synthetic resin piece and is mounted in projecting upper end 8 of the lock bolt so that the upper end or the latch member may be subtended and engaged in different rotary positions of lock cylinder 3 either by cam 7 or by cam 10, which cams are axially spaced from each other, as can best be seen in FIG. 1. The recess in lock bolt end 8 is open on top and at the bottom, latch member 11 having stop 11c projecting into the open top of the recess for engagement with a shoulder formed by the upper lock bolt end to prevent forward movement and removal of the latch member. The latch member is forwardly biased by soft spring 26 whose forward end presses against latch member 11, thus tending to hold stop 11c in engagement with the shoulder, while its rear end is attached to pin 12 which prevents the latch member from being removed from its recess rearwardly.

Figure 7:
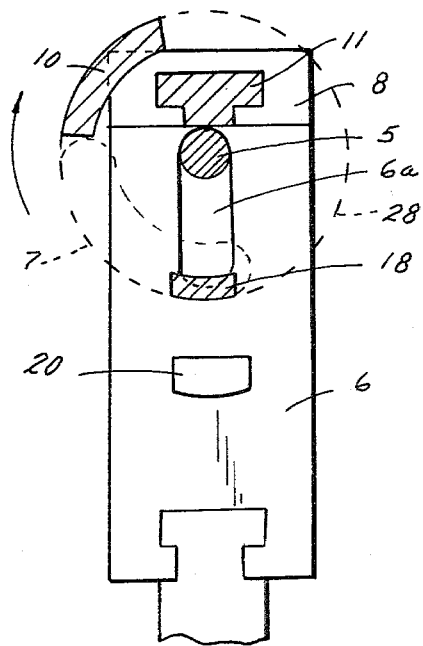
Figure 8:
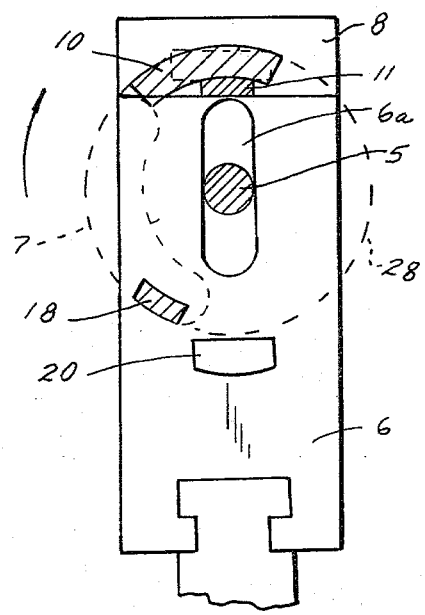

When lock cylinder 3 is turned 90° by ignition key 17a from the OFF-position, wherein the lock bolt is in the locking position (FIG. 7), as illustrated in FIG. 8 which shows a position intermediate the OFF-and driving positions, the lock is in the driving position shown in FIG. 5. The clockwise rotation of the lock cylinder and control ring 28 cause cam 7 to move under projecting upper end 8 of lock bolt 6 and to lift the lock bolt into its retracted position during the driving position of the lock cylinder. While this rotary movement proceeds sequentially from the OFF-position of FIG. 7, to the intermediate position of FIG. 8 to the driving position of FIG. 5, the oblique camming face of arcuate cam 10, which slopes gradually upwardly from control ring 28, as shown in FIG. 3, transits latch member 11 and engages it so as to move the latch member inwardly against the bias of spring 26. At the end of the turn, the oblique camming face of cam 10 has been moved out of engagement with latch member 11 and spring 26 biases the latch member outwardly so that the periphery of cam 10 subtends the projecting latch member 11 during rotation of the lock cylinder from the driving into the ready-to-lock position for maintaining the lock bolt in the retracted position and lock bolt 6 is held in the retracted position by the engagement of cam 7 with projecting latch member 11, as shown in FIG. 5.

The oblique camming face of second arcuate cam 10 slopes gradually upwardly from control ring 28 in a radial direction as well as in a peripheral direction so as to engage latch member 11 during the above-described rotary movement of the control ring in a manner to press the latch member inwardly against the bias of spring 26. The upwardly projecting edge of cam 10 holds lock bolt 6 in retracted position when cam 7 is turned back. There remains a space to permit spring 22 to exert substantially no bias on the lock cylinder in the locking position of the lock bolt.

Figure 2:
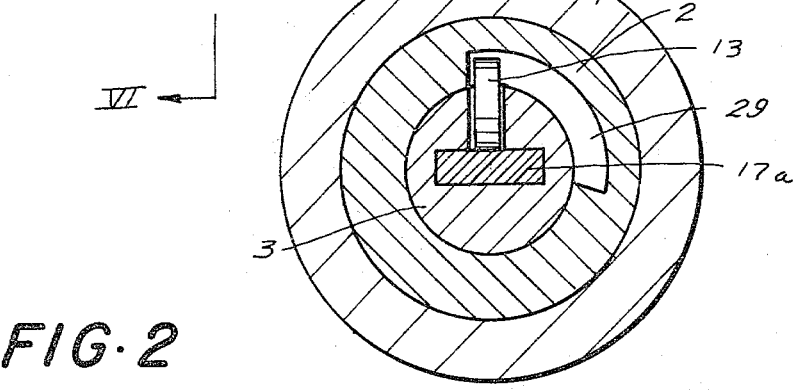
FIG. 2 is a sectional view along line II—II of FIG. 1.

As shown in FIGS. 1 and 2, lock cylinder 3 defines an axial slot 17 for receiving ignition key 17a and radial slot 14 in communication with the axial slot. Wedge element 13, which is a disc in the illustrated embodiment, is mounted in radial slot 14 for sensing key 17a in the axial slot, housing 1 defining arcuate slot 29 concentrically surrounding a portion of the periphery of lock cylinder 3 and in communication with axial slot 14, the element extending into arcuate slot 29 when it is displaced thereinto by the insertion of key 17a. In the OFF-position, wedge element 13 extends into the axial slot or keyhole of the lock cylinder. When the key is inserted, its points will contact the wedge element and, upon further inward movement of the key in the keyhole, will slide element 13 radially outwardly out of the keyhole and into slot 29, as shown in FIGS. 1 and 2. The arc of slot 29 is so dimensioned that wedge element 13 extending into this slot delimits the end positions of the rotary movements of lock cylinder 3. The segmental profile of slot 29, which conforms to the periphery of element 13, also delimits the axial displacement of the lock cylinder and holds the cylinder in its axial position. When key 17a is inserted, wedge element 13 firmly couples lock cylinder 3 to lock barrel 2 against axial displacement of the lock cylinder. Turning of the key will retract lock bolt 6 and engagement of first cam 7 with projecting latch member 11 will keep the bolt retracted against the firm bias of spring 9 in the driving position of the lock cylinder because the spring bias will firmly wedge the cam into engagement with the projecting latch member. Even when lock cylinder 3 is rotated into a position wherein cam 7 and latch member 11 are no longer in engagement (ready-to-lock position of FIG. 6), lock bolt 6 will not be pressed into a steering column locking position, i.e. it will remain retracted, because of the provision of fourth cam 20 on lock bolt 6. This fourth cam is arranged to receive the oblique camming face of third cam 18 into subtending engagement with the fourth cam whereby the lock bolt is temporarily prevented from moving from the retracted into the locking position. This cam integral with the lock bolt thus replaces the spring-biased pivotal latch of my prior patent mentioned hereinabove and considerably simplifies and, therefore, makes less expensive the lock arrangements herein disclosed.

Figure 6:
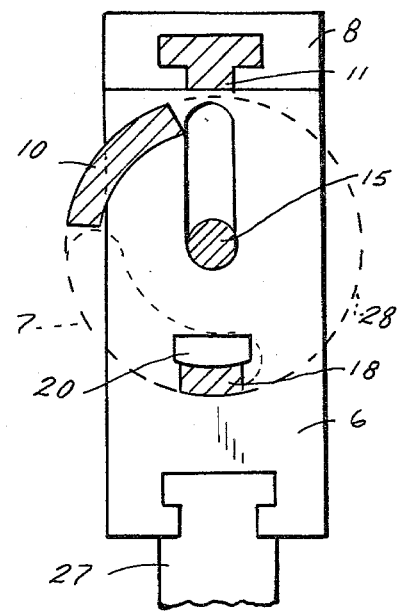

When the lock cylinder is turned counterclockwise from the driving position of FIG. 5 into the ready-to-lock position of FIG. 6, first cam 7 is moved out of engagement with lock bolt 6 so that it can no longer hold it in its retracted position. Nevertheless, the lock bolt cannot move under the bias of spring 9 into its locking position because, at first, the upper edge of the counterclockwise moving second cam 10 is moved into subtending engagement with latch member 11 to hold the lock bolt against movement and, upon further counterclockwise rotation of the lock cylinder when second cam 10 is moved out of engagement with latch member 11, third cam 18 has moved into subtending engagement with fourth cam 20. As long as key 17a remains inserted in keyhole 17 in the ready-to-lock position of FIG. 6, wedge element 13 prevents any axial displacement of lock cylinder 3, as indicated hereinabove and fully described in my above-mentioned patent. Thus, control ring 28 remains axially fixed and the oblique camming face of cam 18 remains engaged with the corresponding engaging face of cam 20. Lock bolt 6 is thus firmly held in position. When the key is withdrawn, wedge element 13 drops into keyhole 17 and, therefore, lock cylinder 3 is no longer coupled to lock barrel 2 and is free to be displaced axially, the pressure of spring 9 causing the oblique camming face of fourth cam 20 to slide along the oblique camming face of third cam 18 to displace lock cylinder 3 axially outwardly as lock bolt 6 moves into its locking position under the bias of spring 9. In the locking position shown in FIG. 7, return spring 22, whose bias is weaker than that of spring 9, moves lock cylinder 3 inwardly into its starting position so that the ignition key may be inserted in the keyhole without hindrance.

What is claimed is:

1. In a lock arrangement for a motor vehicle having a steering column, which comprises
   (a) a housing defining an axial bore and a cross bore intersecting therewith,
   (b) a key controlled lock cylinder mounted in the axial bore of the housing for spring-biased axial displacement from an outwardly into an inwardly displaced position, and for rotation by the key about the axis of the bore in the inwardly displaced position into selected operating positions including a driving position, a ready-to-lock position and a locking position,
      (1) the lock cylinder having an axial keyhole for inserting the key in one axial direction and withdrawing the key in the opposite axial direction,
   (c) a lock bolt mounted in the cross bore for displacement from a retracted position into a locking position upon withdrawal of the key from the keyhole in the opposite axial direction,
      (1) the bolt having a keeper engaging a recess in the steering column in the locking position,
   (d) spring means engaging the lock bolt and biased to displace the lock bolt into the locking position,
      (1) the lock bolt cooperating with the lock cylinder to displace the lock cylinder into the outwardly displaced position during the displacement of the lock bolt into the locking position under the bias of the spring means
   (e) a latch member mounted on the lock bolt, and
   (f) actuating means arranged to displace the lock bolt between the retracted and locking positions, the bolt actuating means including
      (1) a driving member operated by the rotation of the lock cylinder to displace the bolt against the bias of the spring means into the retracted position to disengage the keeper from the steering column, the improvement of
   (g) the latch member being slidable in the direction of the axis and spring-biased into a position projecting from the bolt towards the lock cylinder,
   (h) the driving member including a control ring rotating and axially displaced with the lock cylinder, and eccentric cam means fixedly arranged eccentrically on the control ring, the cam means comprising a first cam cooperating with the latch member in the driving position of the lock cylinder for maintaining the lock bolt in the retracted position, a second arcuate cam having a periphery and an oblique camming face for engagement with the latch member and depressing the latch member against the spring bias during rotation of the lock cylinder from the locking into the driving position, the periphery of the second arcuate cam subtending the projecting latch member during rotation of the lock cylinder from the driving into the ready-to-lock position for maintaining the lock bolt in the retracted position, and a third cam projecting from the control ring towards the lock bolt and having an oblique camming face, and
   (i) a fourth cam fixed on the lock bolt, the fourth cam and the third cam being arranged to position the oblique camming face of the third cam in subtending engagement with the fourth cam in the ready-to-lock position whereby the lock bolt is temporarily prevented from displacement from the retracted into the locking position, the cams being dimensioned and shaped to enable the lock cylinder to be rotated into the selected operating positions and to maintain the lock bolt in the retracted position during the driving and ready-to-lock position of the lock cylinder.

2. In the lock arrangement of claim 1, the lock cylinder defining a radial slot in communication with the keyhole, a wedging element mounted in the radial slot for sensing the key in the keyhole, and the housing defining an arcuate slot concentrically surrounding a portion of the periphery of the lock cylinder and in communication with the radial slot, the wedging element extending into the arcuate slot when the key is in the keyhole and descending into the keyhole when the key has been withdrawn.

3. In the lock arrangement of claim 1 or 2, the latch member being of T-shaped cross section, the lock bolt defining a recess of like cross section and the T-shaped latch member being slidably mounted in the recess.

* * * * *